Figure 1:
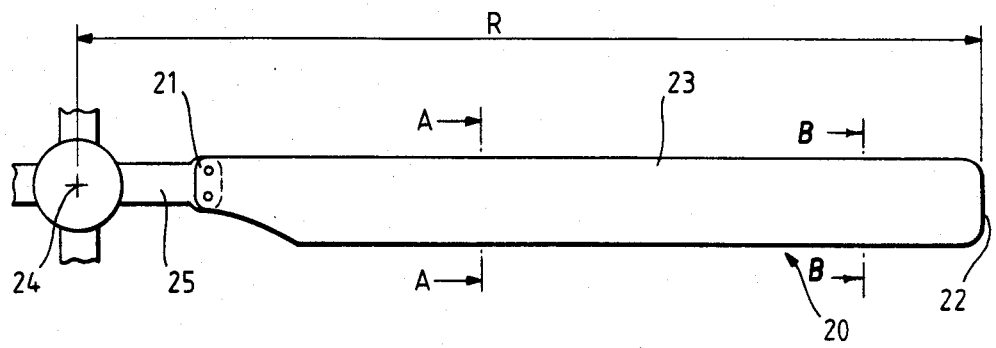

United States Patent [19]

Perry

[11] Patent Number: 4,668,169
[45] Date of Patent: May 26, 1987

[54] HELICOPTER ROTOR BLADE
[75] Inventor: Frederick J. Perry, Yeovil, England
[73] Assignee: Westland plc, Yeovil, England
[21] Appl. No.: 622,275
[22] Filed: Jun. 19, 1984
[30] Foreign Application Priority Data
 Jul. 4, 1983 [GB] United Kingdom ............... 8318109
[51] Int. Cl.⁴ ............................................. B64C 27/46
[52] U.S. Cl. .................................. 416/223 R; 416/228
[58] Field of Search .......... 416/223 R, 223 A, 228 A, 416/229 R, 241 A, 239

[56] References Cited

U.S. PATENT DOCUMENTS

| 318,662 | 6/1943 | Bitterli et al. | 416/223 R |
| 3,782,856 | 1/1974 | Salkind et al. | 416/228 A |
| 4,248,572 | 2/1981 | Fradenburgh | 416/228 A |

FOREIGN PATENT DOCUMENTS

| 36825 | 9/1981 | European Pat. Off. | 416/223 R |
| 37633 | 10/1981 | European Pat. Off. | 416/223 R |
| 421916 | 3/1911 | France | 416/223 R |
| 859557 | 12/1940 | France | 416/223 R |

OTHER PUBLICATIONS

U.S. Ser. No. 318,662 filed 6-1943, Bitterli et al.

Primary Examiner—Robert E. Garrett
Assistant Examiner—Joseph M. Pitko
Attorney, Agent, or Firm—Larson and Taylor

[57] ABSTRACT

An outboard region of a helicopter rotor blade of aerofoil cross section has a thickness to chord ratio not greater than twelve percent and an inboard region has a thickness to chord ratio greater than twelve percent. Preferably, the thickness to chord ratio of the inboard region is greater than eighteen percent and may increase towards the root end to about twenty four percent. The inboard region may extend outwardly to a position not exceeding sixty percent of an operating radius of the rotor blade.

13 Claims, 12 Drawing Figures

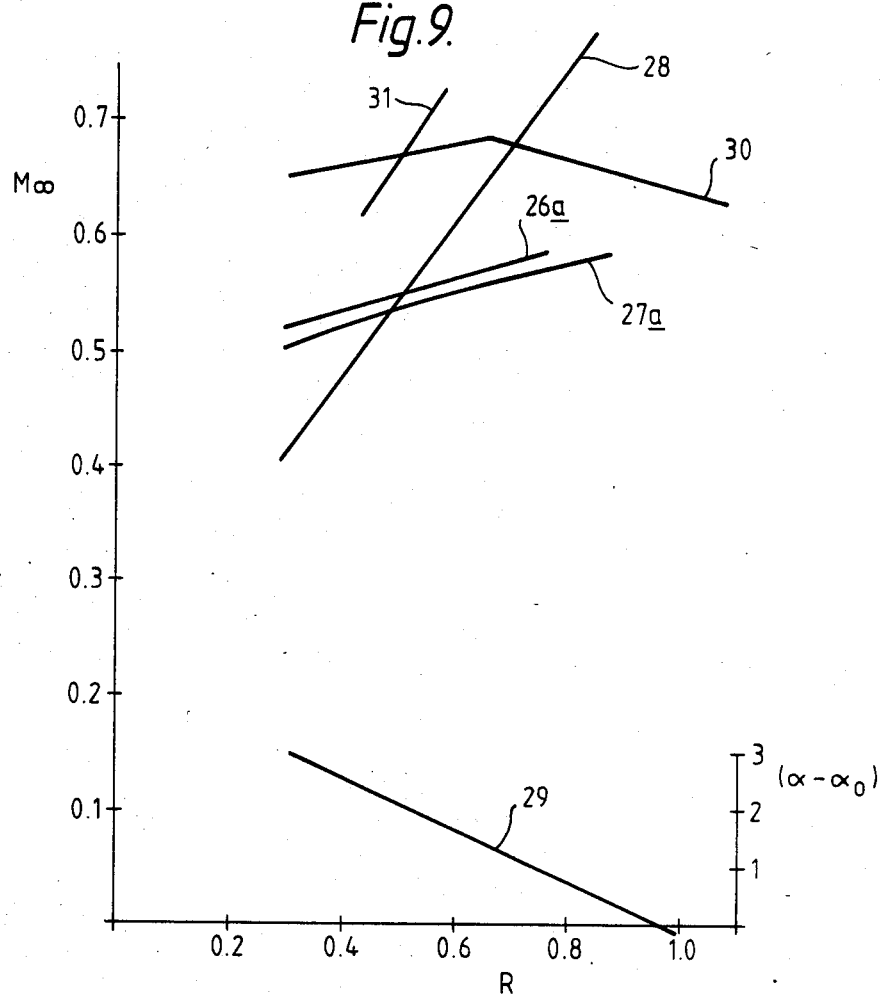
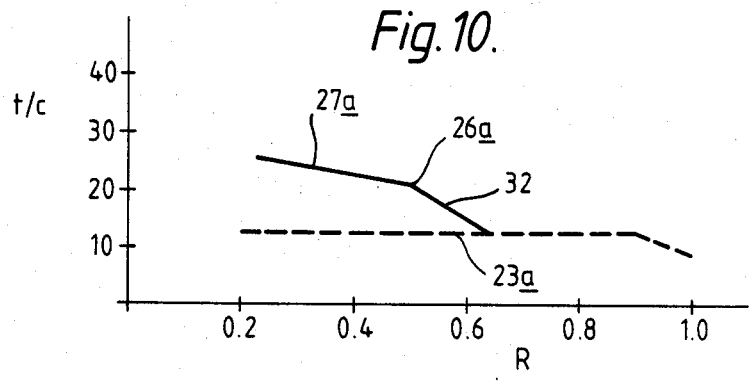

HELICOPTER ROTOR BLADE

DESCRIPTION OF INVENTION

THIS INVENTION relates to helicopter rotor blades and particularly to a composite helicopter rotor blade constructed using fibre reinforced plastics materials.

A study of composite blade design identified several crucial requirements which were difficult to meet, or imposed severe constraints, using existing composite construction techniques and air load estimation methods. The areas of difficulty involved static blade strength, blade flatwise stiffness and torsional stiffness. The two stiffness requirements were the most difficult to meet, since the blade deflections it is required to control are inversely proportional to the spanwise integral of the blade section stiffnesses. Local stiffening has relatively little effect on blade deflections. With aerofoil sections of conventional thickness/chord ratio (t/c) of about twelve percent, these requirements necessitate blades of low aspect ratio, excess weight, or very high carbon fibre content.

An example of this situation is provided by the constraints placed on the flatwise bending stiffness of the blade by blade sailing requirements. Blade flatwise stiffness is required to prevent blade sailing or high flapping deflections at low rotor speeds due to wind gusts.

Thus, in the design of a new composite rotor blade it was decided that the blade should retain the blade sailing characteristics of the rotor on an existing successful helicopter and it was necessary therefore to attempt to reproduce the flatwise stiffness characteristics of the prior blade in order that the flapping responses to gusts of the new composite blade would be acceptable. The prior blade, having a steel spar, is naturally very stiff, and it was decided that whatever margin in flatwise stiffness exists in the prior rotor should be brought across to the new rotor. Unfortunately, unlike metals, which possess more-isotropic properties, composite materials can be stiff either in torsion or in bending (but not both), depending on fibre orientation and, since both high torsion and high flatwise stiffnesses are required, a serious design conflict may result.

Thus, in order to provide the blade designers with more freedom it was decided to conduct an investigation to establish whether useful increases in rotor blade aerofoil section thickness, which would increase both torsion and flatwise stiffnesses, could be introduced at least over blade inboard regions and, preferably, throughout as much of the span of the blade as possible in order to control blade deflections.

Accordingly, this invention provides a helicopter rotor blade having a root end for attachment to a rotor hub, a tip end and a central portion of aerofoil cross section having a thickness dimension and a substantially constant chord dimension and extending between the root and tip ends to define a blade span, characterised in that an outboard region of said central portion has a thickness to chord ratio not greater than twelve per cent and an inboard region of said central portion has a thickness to chord ratio greater than twelve percent.

Preferably, the inboard region has a thickness to chord ratio greater than eighteen percent. The thickness to chord ratio of said inboard region may increase towards the root end, preferably from eighteen to twenty four percent.

The inboard region may extend outwardly to a position not exceeding sixty percent of an operating radius of the rotor blade.

A transition region connects the inboard and outboard regions in which the thickness dimension reduces rapidly between the inboard and outboard regions.

Conveniently the inboard region may be extended inwardly from the blade root end to provide a fairing for a rotor hub to which the rotor blade is attached during operation.

Preferably, the inboard region may comprise an aerofoil section in which the curvature of an upper surface aft of about the fifty percent blade chord station is less than the curvature of the corresponding lower surface. The aerofoil section may have a positive basic pitching moment coefficient and this may generally be greater than 0.02 in magnitude.

Conveniently the aerofoil section of the inboard region comprises an inverted NACA 2421 aerofoil section, preferably modified by incorporation of a NACA 210 camber line.

In another aspect, this invention provides a helicopter rotor including a plurality of rotor blades attached to a rotor hub for rotation about an axis each rotor blade having a root end for attachment to the rotor hub, a tip end and a central portion of aerofoil cross section having a thickness dimension and a substantially constant chord dimension and extending between the root and tip ends to define a blade span, characterised in that an inboard region of the central portion has a thickness to chord ratio greater than twelve percent, an upper surface aft of about a fifty percent chord of lower curvature than a corresponding lower surface and a positive basic pitching moment coefficient.

Figure 2A:
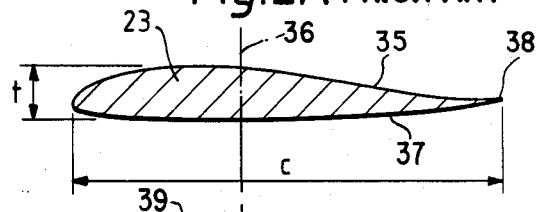
Figure 2B:
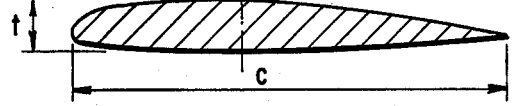
Figure 3:
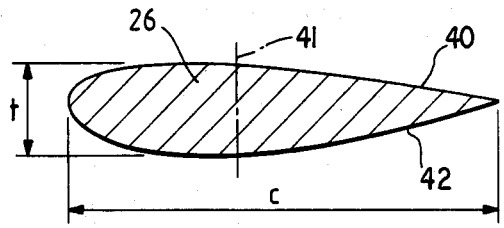
Figure 7:
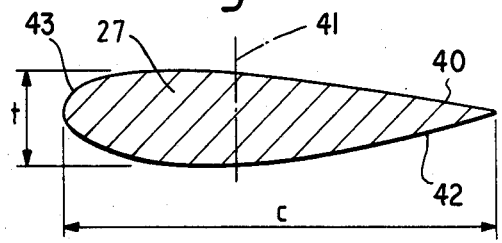
Figure 4:
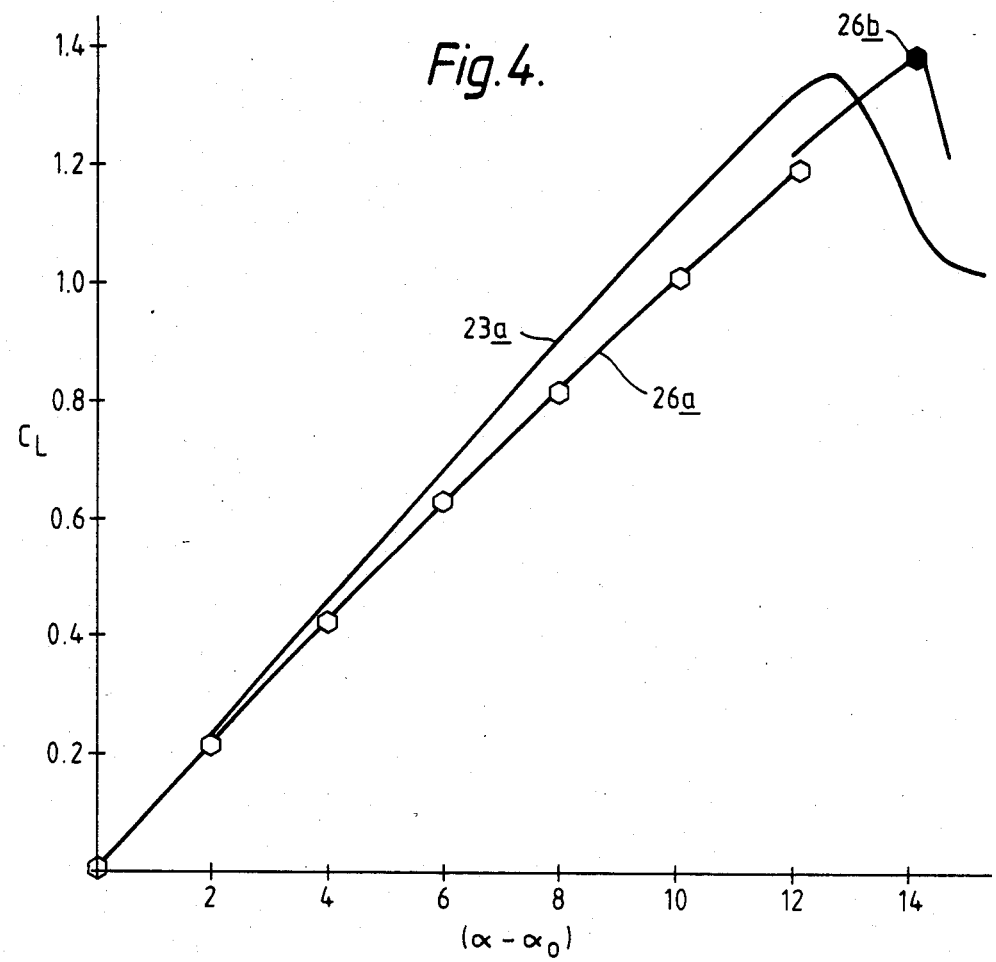
Figure 5:
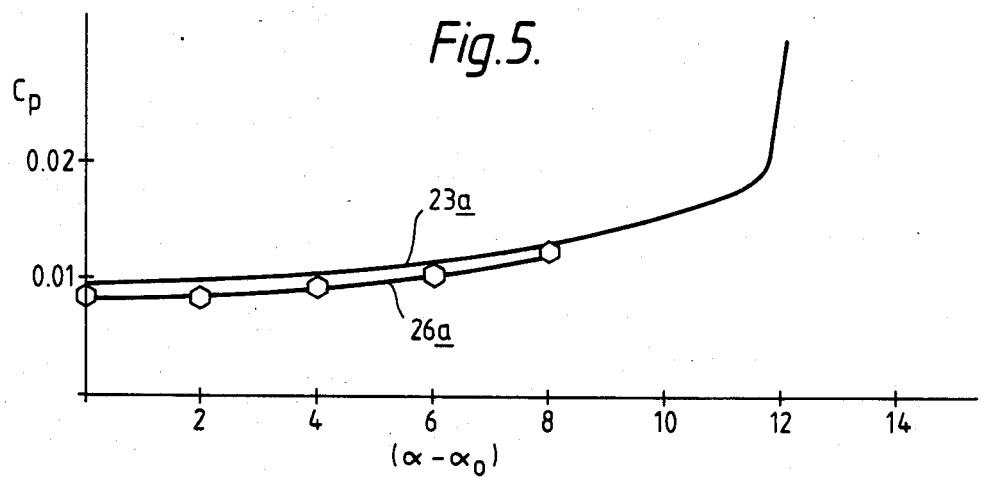
Figure 6:
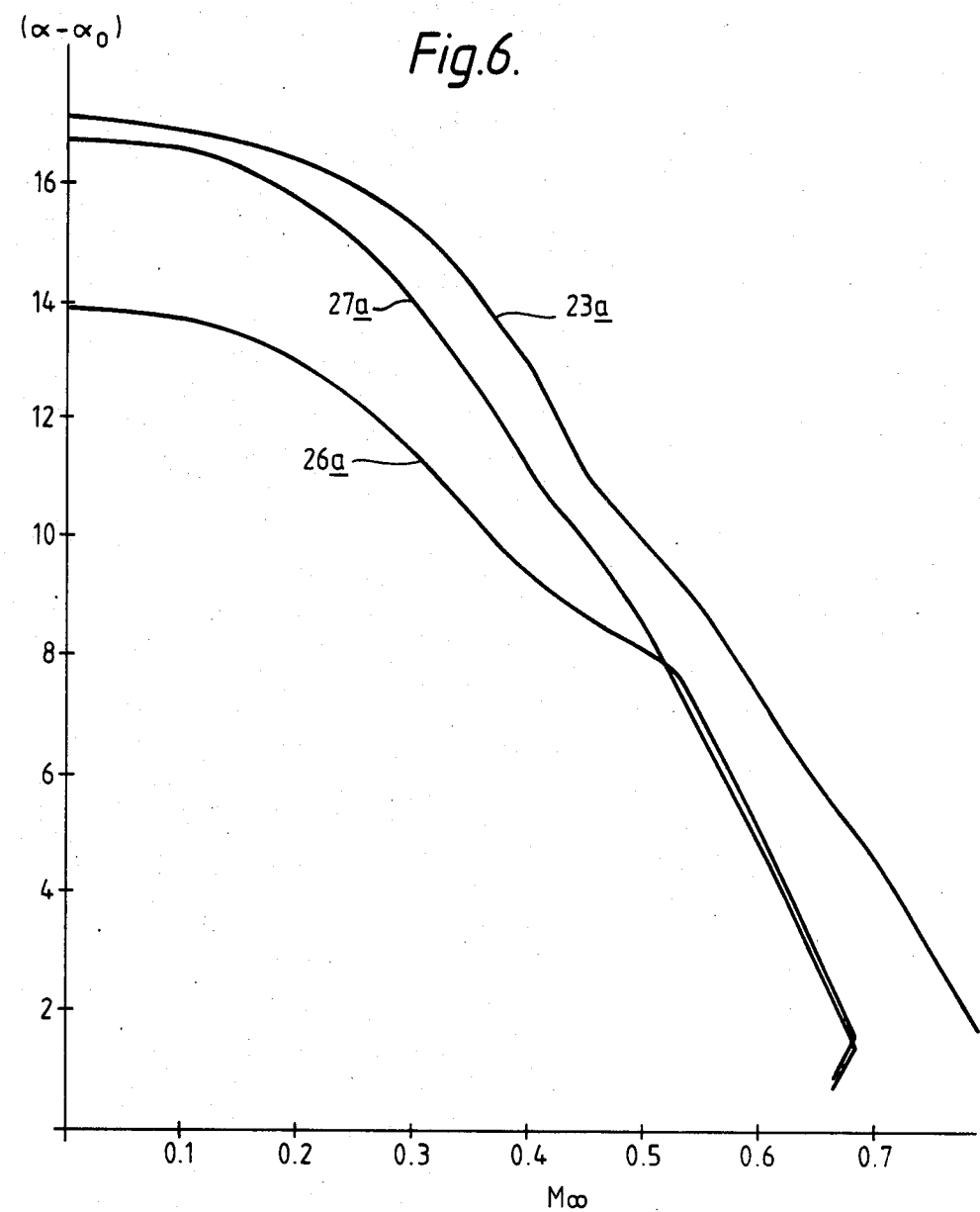
Figure 8:
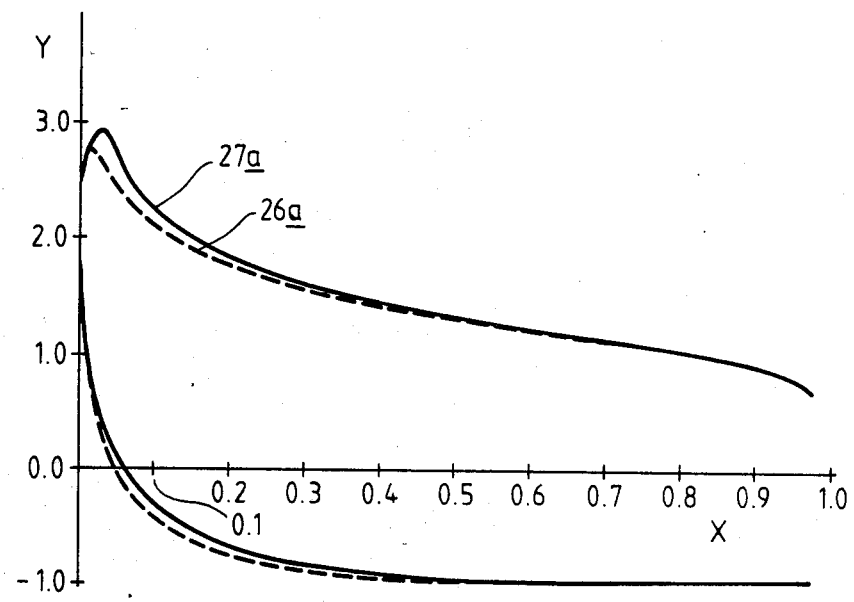
Figure 11:
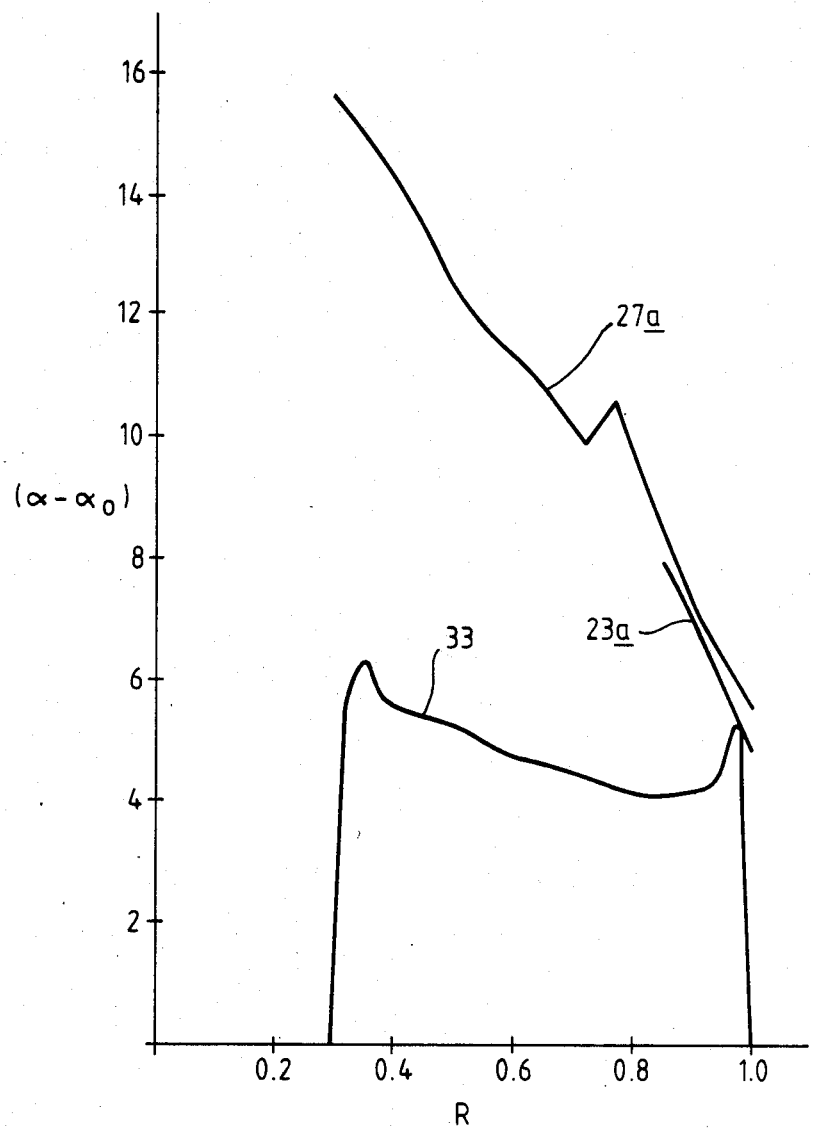

The invention will now be described by way of example only and with reference to the accompanying drawings in which, FIG. 1 is a fragmentary plan view of a helicopter rotor having a plurality of rotor blades, FIG. 2 is a sectioned view illustrating the taken on lines A—A of FIG. 1 and illustrating a known aerofoil section used in the inboard regions of a helicopter rotor blade, FIG. 2B is a sectional view taken on lines B—B pf FIG. 1 and illustrating a known aerofoil section used in the outboard region of a helicopter rotor blade, FIG. 3 is a sectioned view of an unconventional aerofoil section used in the inboard region of the rotor blade of this invention in place of the aerofoil section of FIG. 2A, FIGS. 4 and 5 consist of graphs comparing the measured static performance of the conventional helicopter rotor blade aerofoil section and the unconventionally thick aerofoil section, FIG. 6 is a graph summarising the estimated performance of the thick section and a comparison with a conventional section, and includes the estimated performance of a modified thick section, FIG. 7 is a sectioned view similar to FIG. 3 of a modified unconventionally thick aerofoil section, FIG. 8 compares calculated velocity distributions for the thick aerofoil sections, FIG. 9 is a graph summarising advancing blade considerations, FIG. 10 illustrates an acceptable rotor blade thickness distribution according to the present invention, and FIG. 11 is a graph illustrating inboard aerofoil section capability and performance requirements in hover mode.

Referring now to FIGS. 1, 2A and 2B a helicopter rotor blade 20 includes a root end 21, a tip end 22 and a central portion 34 of aerofoil cross section extending between the root and tip ends to define a blade span dimension. The root end 21 is attached to a rotor hub 25 having an axis of rotation 24 which defines, with the blade tip end 22, a blade operating radius R. As shown in FIG. 2A, the known blade aerofoil section 23 of an inboard region of central portion 34 has a chord dimension c and a maximum thickness dimension t, and it is to be noted that the ratio between the thickness dimension t and the chord dimension c, i.e. t/c ratio, of conventional helicopter rotor blades is normally not greater than twelve per cent.

Briefly, the aerofoil section 23 of FIG. 2A is designed to satisfy the requirements of the distributed aerofoil seciton approach to helicopter rotor blade design described in out prior art U.S. Pat. No. 4,427,344 and has a t/c ratio of twelve percent, a conventional camber of the upper surface 35 aft of about the forty percent chord line 36 represented by a convex curvature that is greater than that of the comparable lower surface 37, and a reflex camber trailing edge 38 providng a concave curved portion that adds to the overall curvature of the upper aft surface of aerofoil section 23. In operation, the reflex camber trailing edge portion 38 provides the desirable nose-up pitching moment that is an important requirement of the inboard regions of helicopter rotor blades constructed according to the aforementioned specification.

The aerofoil section 39 of FIG. 2B used in the outboard region of the rotor blade also has a t/c ratio of twelve per cent and is again conventionally cambered but without a reflex at the extreme tip edge.

The desire to increase the thickness of aerofoil sections at inboard stations of a rotor blade could not be allowed to degrade the aerodynamic performance of the inboard sections. The aerodynamic performance requirements for these sections can be listed as follows:
1. positive basic pitching moment,
2. low drag,
3. adequate steady maximum lift coefficient ($C_{L\ MAX}$) with reference to hover conditions,
4. repeatable and predictable dynamic stall characteristics.

The requirements for a large positive (nose up) basic pitching moment arises from the distributed aerofoil section approach to main rotor design described in our prior U.S. Pat. No. 4,427,344. Failure to achieve the desired level of basic pitching moment in the blade inboard region would restrict the choice of aerofoil section which could be employed in the outboard region and result in a degraded flight envelope. Increasing the thickness dimension and therefore for a given chord dimension, the t/c ratio of an aerofoil section usually has the effect of promoting early trailing edge flow separation which tend to alter the aerofoil pitchng moment and in the case of the known aerofoil section of FIG. 2A would incur operational penalties due to the highly curved aft upper surface. Allowable deviations in basic pitching moment may, therefore, dictate the maximum t/c ratio for inboard sections, particularly if thicker sections of conventional aerofoil section are employed.

A drag penalty is usually associated with sections of t/c ratio greater than twelve percent at moderate values of a lift coefficient ($C_L$) due to the growth of localised boundary layer thickness ($\Omega$) trailing edge separation. This penalty is most important in hover where, with the helicopter transmission or engine power limited, any power loss is felt as a direct reduction in take off weight. Thick sections also encounter local supercritical flow conditions at much lower free stream Mach numbers than the aerofoil sections having a t/c ratio of twelve percent conventionally employed in helicopter rotors. Attention had to be given therefore to advancing blade conditions in forward flight to ensure that excessive power consumption due to drag rise or shock induced flow separation did not occur on the thick inboard aerofoil sections.

The inboard aerofoil section also has to be capable of attaining a maximum lift coefficient ($C_{L\ MAX}$) under steady conditions compatible with hover lift requirements. These requirements vary widely from rotor to rotor depending chiefly on blade twist. Highly twisted blades can generate very high $C_L$'s at inboard stations.

Although the distributed aerofoil section rotor blade design of our aforementioned U.S. Pat. depends on the conclusion that the rotor performance envelope is much more sensitive to outboard aerofoil section performance limits than those of inboard sections, and stalling of inboard blade stations in forward flight may be impossible to prevent, nevertheless, it is desirable that the aerofoil sections used at inboard stations exhibit as high a $C_{L\ MAX}$ as possible within geometric constraints and achieve predictable and repeatable dynamic stall behaviour to minimise differences in responses from blade to blade.

Very little data existed for aerofoil sections having a t/c ratio greater than twelve percent in the Mach number range of interest to the helicopter blade designer. However, data for a wide range of aerofoil sections over a large range of Reynolds numbers under low Mach number conditions is known from various sources such as the "Theory of Wing Sections" by I. A. Abbott and A. E. van Doenhoff published by Dover Publications, New York in 1949. A review of this data confirmed the performance penalties for conventional thick aerofoil sections outlined above; however it also indicated that an unconventional approach could yield very thick aerofoil sections capable of satisfying all inboard aerodynamic performance requirements in the design of a composite helicopter rotor blade.

The data of the above reference was studied for trends which would indicate the extent to which the thickness of inboard aerofoil sections could be increased. The data shows that for conventional sections, as thickness is increased beyond twelve per cent, early trailing edge separation occurs, producing a divergence of pitching moment, a rolling over of lift and a pronounced creep of drag—all undesirable characteristics in the context of a helicopter rotor.

Since data for aerofoil sections with unconventional (nose up) basic pitching moment was required, the negative lift characteristics of the conventionally cambered aerofoils of the reference were studied for trends, and a family of sections with suprisingly high performance when operating inverted was discovered. It was therefore decided that the thicker members of this family warranted further consideration since it appeared that with slight modification they could form the basis of a set of aerofoil sections which would satisfy all the requirements for the aerodynamic performance of inboard sections of helicopter rotor blades.

FIG. 3 is a sectioned view of the most promising of this family of aerofoil sections, an inverted NACA 2421 aerofoil section indicated by reference numeral 26. The NACA 2421 designation indicates an aerofoil section developed by the National Advisory Committee for Aeronautics, a predecessor of the National Aeronautics and Space Administration of the United States of America, and information has been published, e.g. in the above reference, is available in most technical libraries, and is well known to aerodynamicists. Briefly, the NACA 2421 aerofoil section is characterised by a thickness to chord ratio (t/c) of twenty one percent (indicated by the last two numbers of the designation), Also, when operating inverted (as shown in FIG. 3), the curvature of the upper surface aft of about the forty percent chord station 41 is less than that of the corresponding lower surface 42 to provide for a positive or nose up basic pitching moment coefficient generally greater than 0.02 in magnitude. In order to indicate unconventional inverted operation, we added a negative index to the known designation, i.e. NACA $2421^{-1}$. It appeared that a thick aerofoil section with these unconventional characteristics might avoid the aerodynamic performance penalties of high drag and low stalling lift coefficient normally associated with the thick sections of conventional aerofoil shape previously considered for helicopter rotor blades, and that it might therefore be possible to utilise such a section to a useful spanwise extent of an inboard region of a helicopter rotor blade in place of section 23 of FIG. 2A. FIGS. 4 and 5 respectively compare the measured static performance of the conventional aerofoil section 23 of FIG. 2A having a t/c ratio of twelve percent and the unconventionally thick aerofoil section 26 of FIG. 3 having a t/c ratio of twenty one percent. It should be noted that in the past, aerofoil data from different test facilities had been found to be compatible provided Reynolds number and transition fixing arrangements are similar. In the graphs, line 23a represents the conventional section 23 and line 26a represents the unconventional section NACA $2421^{-1}$, FIG. 4 plotting lift coefficient ($C_L$) against incidence ($\alpha - \alpha_o$) and FIG. 5 plotting drag coefficient ($C_p$) against incidence ($\alpha - \alpha_o$). The data of FIGS. 4 and 5 are for similar Reynolds numbers and free transition: however, although Mach numbers are low, they are not identical. Nevertheless several important observations were made.

Thus, unconventionally thick aerofoil section NACA $2421^{-1}$ (26a) possesses a high static $C_{L\ MAX}$, despite its adverse basic loading. There is little rolling over of the lift characteristics prior to stall, unlike conventional thick aerofoil sections. Finally the drag characteristics of NACA $2421^{-1}$ (26a) did not exhibit the drag creep with incidence normally observed with thick aerofoil sections, its drag being closely comparable with that of the conventional aerofoil section (23a) shown for comparison.

As opposed to its behaviour when operating conventionally, where stalling is of the progressive trailing edge separation type with gradual loss of lift and growth of drag, when operating inverted NACA 2421 exhibits the sharp leading edge stall characteristics of a conventional helicopter aerofoil section. This behaviour and the absence of drag creep is probably due to the low trailing edge angle and the low surface curvature of the critical rear upper surface due to unconventional camber. Its stalling point (26b) was predicted using a leading edge stall criterion and is shown in FIG. 4, indicating that the stalling behaviour of NACA $2421^{-1}$ will be both predictable and repeatable in the dynamic case. The stall criterion used is discussed in a paper "Onset of Leading Edge Separation Effects under Dynamic Conditions and Low Mach Numbers" presented to the 34th AHS National Forum in May 1978 by T. S. Beddoes, and in an article "Analysis of Computed Flow Parameters for a Set of Sudden Stalls in Low Speed Two Dimensional Flow" by W. T. Evans and K. T. Mort and published as NASA TND-85 in 1959.

It should be explained that the data in "Theory of Wing Sections" does not define the inverted stall of NACA 2421 at a Reynolds number of $3 \times 10^6$. This is true for most of the aerofoil section data from this source. However, the calculated critical values of the leading edge criterion parameters for the stall defined at the higher Reynolds number of $6 \times 10^6$ lie in a region where the leading edge criterion is well defined and where experience has shown that good correlation extends to Reynolds numbers as low as $3 \times 10^6$.

NACA $2421^{-1}$ achieves a higher basic pitching moment that the inboard sections described in our said European Patent Application EP-A-0,037,633. This was considered a useful additional characteristic since for a given radial extent of inboard aerofoil section, the substitution of a section similar to NACA $2421^{-1}$ should allow a higher level of aft loading in the blade outboard region to be tolerated, with an improvement to the rotor flight envelope. Alternatively, while maintaining the same net blade torsional moment an existing outboard aerofoil section might be extended further inboard.

It became clear therefore that, at low Mach numbers, an aerofoil section similar to NACA $2421^{-1}$ had better moment characteristics than a conventional aerofoil section having a t/c ratio of twelve percent, had comparable drag and static lift characteristics, and provided an increase in thickness for a given chord dimension of seventy-five percent. Furthermore, bearing in mind its adverse nose camber and adverse basic loading, we were confident that further improvements could be made through local modifications of its nose geometry. However having determined that the NACA $2421^{-1}$ aerofoil section could provide a basis for the design of unconventionally thick aerofoil sections for inboard use, it was then necessary to investigate the behaviour of the section at higher Mach numbers in order to determine whether or not they could be used in rotor blades for a helicopter main sustaining rotor.

The thick NACA 4-digit series aerofoils had been shown to possess surprisingly good performance and other characteristics suitable for use at inboard rotor blade stations when operated inverted. Their stalling behaviour could be predicted using the leading edge stall criterion of NASA TND-85: however, this is restricted in application to low or moderate free stream Mach numbers, and before the thick sections could be used in a helicopter rotor design, their behaviour at higher Mach numbers had to be checked.

Very little test data on the performance of thick aerofoil sections existed for high Mach numbers approaching the point of shock induced separation, but nevertheless it was possible to make a first order estimate of the behaviour of the aerofoils to confirm their suitability for rotor design. For the purpose of rotor design it is required to know the lift and Mach number conditions for drag rise, and the conditions for shock induced separation.

Fortunately an estimate of the onset of drag rise could be made based on available data. Drag rise at high free stream Mach number arises due to the presence of shocks which increase drag directly by pressure forces on the aerofoil and indirectly through their effects on the aerofoil boundary layer. Shocks only exist to terminate a region of supersonic flow near the aerofoil surface and therefore the onset of supercritical conditions may be related to the onset of drag rise. The critical Mach number at a given incidence can be calculated and, based on test data, drag rise was assumed to occur at Mach numbers 0.03 beyond the critical Mach number.

It was noted that the inverted NACA 4-digit aerofoils under consideration were similar in form to modern supercritical aerofoils when operating inverted and their performance in terms of drag rise and shock strength could be better than that indicated by our analysis. The use of the beginning of drag rise as a limit for normal operating conditions on the rotor provided a conservative estimate of the usefulness of unconventionally thick sections.

It was also necessary to predict the onset of shock induced separation to ensure that an adequate margin existed to cater for unintentional excursions from the design flight conditions.

General experience shows that a low trailing edge flow deflection angle or a low rear upper surface curvature is beneficial at higher Mach numbers beyond the critical. A low trailing edge angle and low upper surface curvature could be achieved either by general aerofoil thinning or, in the case of the aerofoils considered here, through the use of unconventional camber over the rear of the aerofoil chord. Aerofoils such as the thick NACA 4-digit series could be expected to reach higher Mach numbers when operating inverted than when operating conventionally. The advantages of low trailing edge angle and low rear upper surface curvature in low Mach number lift and drag characteristics have already been noted.

FIG. 6 summarises the estimated performance of NACA 2421$^{-1}$ aerofoil section 26 of twenty one percent t/c, indicated at 26a, as a function of Mach number ($\infty_{oo}$) and incidence ($\alpha - \alpha_o$) following the previously derived analysis. Also shown for comparison at 23a is the performance of the conventional aerofoil section 23 of twelve percent t/c. The performance limits indicated are based on leading edge criterion calculations defining the dynamic stalling behaviour at low Mach numbers and a shock induced separation criterion for higher Mach numbers and low incidence. In the case of the conventional aerofoil section 23 the calculations were supported by tests in the Mach number range from 0.3 to 0.8.

At low Mach numbers, NACA 2421$^{-1}$ performance (26a) is significantly lower than the performance of the conventional aerofoil section (23a). In forward flight, therefore, if this section were substituted for the conventional aerofoil section at inboard blade stations, flow separations would develop earlier. Following the teaching of distributed aerofoil section blades disclosed in our said European Patent Application EP-A-0,037,633 that inboard flow separations need not be damaging to rotor performance, it was considered worthwhile investigating whether modifications to the section could improve performance without seriously changing other aspects of the section behaviour.

NACA 2421$^{-1}$ avoids premature trailing edge separation through the low upper surface trailing edge angle and low curvature of the rear upper surface 40 imparted by unconventional camber. This camber, however, results in an adverse basic loading which the incidence dependant component of lift must overcome. The adverse basic loading may be overcome by the superposition of a second camber line following the method described in the aforementioned "Theory of Wing Sections". This second camber line however must not significantly steepen the trailing edge slopes, and its influence on moment characteristics must be minimal. This second camber line should therefore concentrate its loading in its nose region. The NACA 210 camber line corresponds to these general guidelines and a new section NACA 210.2421$^{-1}$ was defined in an attempt to provide a thick inboard section of improved performance. The t/c ratio of this new section 27 was again twenty one percent.

The cross sectional shape of the new section NACA 210.2421$^{-1}$ is shown at 27 in FIG. 7 and the change in shape of nose portion 43 is evident from a comparison with FIG. 3. The performance of the new section is shown in 27a in FIG. 6. Leading edge criterion calculations show that the discrepancy in dynamic stalling performance at lower Mach numbers between the conventional aerofoil section (23a) and NACA 2421$^{-1}$ (26a) have been practically removed by the modifications culminating in the new section (27a).

FIG. 8 plots local velocity (Y) against chordwise distance (X) and gives a comparison of calculated velocity distributions for NACA 2421$^{-1}$ (26a) and NACA 210.2421$^{-1}$ (27a) at their respective critical incidences according to the leading edge criterion. It will be noted that the velocities over the rear of the aerofoil sections are practically identical, indicating that the new NACA 210.2421$^{-1}$ section (27a) will exhibit static performance unaffected by trailing edge separation similar to NACA 2421$^{-1}$ (26a). The estimated shock induced separation boundary is also almost identical, reflecting the similarity of the trailing edge geometries of the two thick aerofoil sections.

Our investigations had shown, therefore, that it was possible to define an unconventionally thick aerofoil section for use at inboard stations of a helicopter rotor blade which satisfied the design requirements for inboard rotor blade sections and imposed no significant aerodynamic performance penalties. The performance of these sections is based on reliable calculation and test data. However, it remained necessary to define the radial extent over which such thick sections could be utilised, and to define performance margins for specific rotor flight conditions.

Having developed a knowledge of the limitations of unconventionally thick sections at high lift and high Mach number, these guidelines were then applied to the design of a main rotor. The example chosen was a helicopter with a high rotor blade tip speed of 145 ft/sec, which generates high Mach number conditions relatively far inboard on the advancing blade, which conditions are likely to form the most serious constraints to the application of the new sections.

Advancing blade considerations are summarised in FIG. 9 which plots Mach number ($\infty_{oo}$) at an azimuth angle of 90 degrees against radial position R. Flight at 140 kt sea level ISA conditions is taken as required cruising speed, at which point drag rise from inboard sections will not be accepted, and the calculated advancing blade lift distribution for such a condition is shown at 28 in FIG. 9, in an idealised fashion. The radial variation of drag rise Mach number is shown for the unconventionally thick aerofoil sections NACA $2421^{-1}$ (26a) and $210.2421^{-1}$ (27a) appropriate to the incidence requirements shown. Also shown at 29 is the radial variation of free stream Mach number.

The drag rise Mach number variation is small from aerofoil section to aerofoil section for the thick sections and its radial variation is small with respect to that of free stream Mach number from blade root to tip. The Figure shows that NACA $2421^{-1}$ (26a) can be utilised outboard to fifty percent rotor radius and the modified NACA $210.2421^{-1}$ (27a) can be used to forty eight percent rotor radius, without drag rise penalties. It should be noted that decreasing section thickness is not very powerful in reducing the radial extent of supercritical flow on the advancing blade. It should be remembered also that conventional sections having a t/c ratio of twelve percent operate supercritically well into drag rise on the advancing blade and often penetrate shock induced separation conditions near the blade tip.

The shock induced separation boundary of NACA $210.2421^{-1}$ section is shown at 30 in FIG. 9. An ample margin exists at the design point before shock induced separation will occur, the separation limit at fifty per cent radius corresponding to 186 kt at sea level ISA $-45°$ C., shown at 31 in FIG. 9, indicating that the use of such thick sections outboard as far as sixty percent rotor radius is a practical proposition for some rotors.

FIG. 10 plots t/c ratio against radial position R and illustrates an acceptable blade inboard thickness distribution. Shown for comparison at 23a is the t/c ratio of twelve percent of conventional aerofoil sections (23) (FIG. 2). A large drag rise performance margin exists inboard of fifty percent rotor radius indicating that very thick sections may be chosen for the extreme root end of a rotor blade and it will be noted that the t/c ratio (27a) of the modified NACA 2421 aerofoil section hereinbefore described increases inwardly from about twenty one percent (t/c ratio of NACA $2421^{-1}$ section shown at 26a) at fifty percent radius to about twenty four percent at the extreme root end. This inwardly increasing t/c ratio assists in achieving required dynamic properties and also illustrates that, whilst the aerofoil section hereinbefore described has a t/c ratio of twenty one per cent, it is clear that thicker sections having a t/c ratio at least up to about twenty four percent and having similar unconventional characteristics could also be used in a rotor blade according to this invention. Outboard of about fifty percent rotor radius a transition region 32 is provided in which the thickness dimension reduces rapidly to conventional levels in order to avoid strong shocks.

FIG. 11 plots incidence $(\alpha-\alpha_o)$ against radial position R and relates the incidence capabilities of the inboard sections to the incidence requirements indicated at 33 for a hover condition. The example shown is for a helicopter near the hover envelope limit set by tip stalling, the steady stall limit of thick section NACA $210.2421^{-1}$ being indicated at 27a and that of a conventional section at 23a. As will be seen, an ample performance margin exists from the unconventionally thick section 27a.

Our investigations therefore showed that unconventionally thick inverted aerofoil sections can be used and over a surprisingly large radial extent of the inboard region of a helicopter main rotor blade. The use of such sections involved no aerodynamic performance penalty and can lead to performance improvements due to their higher basic pitching moments and their effect on the design of blade outboard aerofoil sections.

Additionally, the use of a very thick aerofoil section at the blade root station provided an opportunity to reduce one of the most serious causes of parasitic power consumption. The NACA $2421^{-1}$ section provided a space envelope sufficient to completely contain the existing blade root fittings, doublers, side plates and bolts of a conventional helicopter rotor hub. Clearly, therefore, a significant power saving could be achieved by containing the blade root reinforcement and attachment fittings within the aerofoil section envelope. Furthermore, by extending the thickened blade root section inboard beyond the blade attachment in the form of a fairing, even larger power savings would be possible.

Thus, apart from giving a blade designer the freedom to provide a composite blade having optimum torsional and flatwise bending stiffnesses, the use of unconventionally thick aerofoil sections at inboard stations of a helicopter rotor blade according to this invention also provides an opportunity, by extending the sections inboard of a blade root attachment, to provide an efficiently faired rotor hub which will improve the performance of the helicopter and provide a significant reduction in fuel consumption. In this respect it should be noted that the present invention can equally be applied to helicopter main sustaining rotors and to anti-torque rotors.

What is claimed is:

1. A helicopter rotor blade having a root end for attachment to a rotor hub, a tip end and a central portion of aerofoil cross section having a thickness dimension and a substantially constant chord dimension and extending between the root and tip ends to define a blade span, an outboard region of said central portion having a thickness to chord ration not greater than twelve percent and an inboard region of said central portion having a thickness to chord ratio greater than twelve percent, wherein the inboard region of the central portion comprises a cambered aerofoil section in which the curvature of the upper surface aft of about the forty percent blade chord station is less than the curvature of the lower surface.

2. A rotor blade as claimed in claim 1, wherein said inboard region has a thickness to chord ratio greater than eighteen percent.

3. A rotor blade as claimed in claim 1, wherein the thickness to chord ratio of said inboard region increases towards the root end.

4. A rotor blade as claimed in claim 3, wherein thickness to chord ratio increases from eighteen to twenty four percent.

5. A rotor blade as claimed in claim 1, wherein said inboard region extends outwardly to a position not exceeding sixty percent of an operating radius of the rotor blade.

6. A rotor blade as claimed in claim 1, and including a transition region connecting the inboard and outboard regions in which the thickness dimension reduces rapidly between the inboard and outboard regions.

7. A rotor blade as claimed in claim 1, wherein the inboard region extends inwardly beyond the blade root end to provide a fairing for a rotor hub to which the blade is attached during operation.

8. A rotor blade as claimed in claim 1, wherein the aerofoil section of the inboard region has a positive basic pitching moment coefficient greater than 0.02.

9. A rotor blade as claimed in claim 1, wherein the aerofoil section of said inboard region comprises an inverted NACA 2421 aerofoil section.

10. A rotor blade as claimed in claim 9, wherein said NACA 2421 aerofoil section is modified by incorporation of a NACA 210 camber line.

11. A rotor blade as claimed in claim 1, wherein the blade is constructed of fibre reinforced plastics materials.

12. A rotor blade as claimed in claim 1 wherein the camber of the aerofoil section of the inboard region of the central portion is modified by second camber line to increase aerofoil loading in the nose region of the aerofoil.

13. A helicopter rotor including a plurality of rotor blades attached to a rotor hub for rotation about an axis, each rotor blade having a root end for attachment to the rotor hub, a tip end and a central portion of aerofoil cross section having a thickness dimension and a substantially constant chord dimension and extending between the root and tip ends to define a blade span, wherein an inboard region of the central portion has a thickness to chord ratio greater than twelve percent, an upper surface aft of about a fifty percent chord of lower curvature than a corresponding lower surface and a positive basic pitching moment coefficient.

* * * * *